(12) United States Patent
Santos et al.

(10) Patent No.: US 11,813,226 B2
(45) Date of Patent: Nov. 14, 2023

(54) SPA SHELL REINFORCEMENT SYSTEMS AND METHODS

(71) Applicant: BULLFROG INTERNATIONAL, LC, Herriman, UT (US)

(72) Inventors: Robert Santos, South Jordan, UT (US); Richard Alex Eddington, South Jordan, UT (US); Evan Smail, West Jordan, UT (US); Mark McLane, Lehi, UT (US); Eric Hales, Eagle Mountain, UT (US); Michael Adams, West Jordan, UT (US)

(73) Assignee: Bullfrog International, LC, Herriman, UT (US)

( * ) Notice: Subject to any disclaimer, the term of this patent is extended or adjusted under 35 U.S.C. 154(b) by 0 days.

(21) Appl. No.: 17/524,105

(22) Filed: Nov. 11, 2021

(65) Prior Publication Data

US 2023/0142127 A1 May 11, 2023

(51) Int. Cl.
*A61H 33/00* (2006.01)

(52) U.S. Cl.
CPC ..... *A61H 33/6005* (2013.01); *A61H 33/0087* (2013.01)

(58) Field of Classification Search
CPC ........................ A61H 33/6005; A61H 33/0087
USPC ........ 4/541.1, 491, 493, 538, 488, 619, 670, 4/549, 548
See application file for complete search history.

(56) References Cited

U.S. PATENT DOCUMENTS

| | | | | |
|---|---|---|---|---|
| 4,142,337 A | * | 3/1979 | Holcomb | A61H 33/02 52/741.12 |
| 5,345,621 A | * | 9/1994 | Livingston | A47K 3/02 4/584 |
| 5,514,315 A | * | 5/1996 | Watkins | B29C 44/12 264/514 |
| 6,231,938 B1 | * | 5/2001 | Gockel | B32B 27/08 428/152 |
| 2004/0148695 A1 | * | 8/2004 | Fidel | B29C 70/30 4/541.1 |
| 2005/0132487 A1 | * | 6/2005 | Layfield | A61H 33/0087 4/541.1 |
| 2005/0166311 A1 | * | 8/2005 | Yandell | B32B 27/12 4/541.1 |

(Continued)

FOREIGN PATENT DOCUMENTS

| | | |
|---|---|---|
| DE | 4223993 A1 | 2/1994 |
| DE | 19540024 A1 | 1/1997 |
| FR | 2716102 A1 | 8/1995 |

OTHER PUBLICATIONS

European Patent Office, "European Extended Search Report," European Application No. 22206936.1, dated Mar. 24, 2023.

*Primary Examiner* — Lori L Baker
(74) *Attorney, Agent, or Firm* — Dentons Durham Jones Pinegar; Sarah W. Matthews (57) ABSTRACT

A system and method for reinforcing a spa shell includes a structural support layer on an underside of the spa shell. The structural support layer may include an inner layer of rigidizer, a central foam layer, and an outer layer of rigidizer. The structural support layer may extend from a bottom side of the underside of the spa shell, across at least one sidewall of the underside of the spa shell to a lip of the spa shell, the structural support layer forming at least one rib along the sidewall of the underside of the spa shell.

14 Claims, 4 Drawing Sheets

(56) References Cited

U.S. PATENT DOCUMENTS

| | | | |
|---|---|---|---|
| 2008/0022447 A1* | 1/2008 | Krause | A47K 3/022 4/541.1 |
| 2014/0102634 A1* | 4/2014 | Harder | B29C 33/0033 156/253 |
| 2021/0095488 A1* | 4/2021 | Tulett | A61H 33/6005 |

* cited by examiner

SPA SHELL REINFORCEMENT SYSTEMS AND METHODS

TECHNICAL FIELD

The present disclosure relates generally to spa shells. More specifically, the present disclosure relates to a materials and methods for structurally supporting spa shells.

BACKGROUND

Hot tubs or spas typically comprise a containment vessel with a water-impermeable interior surface that is shaped to provide for a number of seating or other internal areas of the spa. This interior surface or shell is often extended at the top to form a crowned lip that may serve as the top surface or deck of the spa. The shell is often made of a thermoformable acrylic or other plastic, and may be formed within a female mold, over a male mold, or, between female and male molds. For example, shells may be manufactured from an acrylic or other material applied to the interior of a female mold. After being allowed to harden, the shell is typically removed from the mold, and is subsequently treated with one or more layers of material designed to provide strength to the structure, such as fiberglass. Fiberglass has many environmental drawbacks. However, other rigidizing materials may not provide sufficient strength to support a spa shell under heavy loads. This may be particularly true of spas that hold greater than one thousand gallons of water, typically known in the industry as swim spas. While spa shells may have rigid structures provided by fiberglass, this is not an environmentally or installation-friendly material.

SUMMARY OF DISCLOSURE

According to the present disclosure, a shell reinforcing system may include a spa shell for containing water having one or more jets extending therethrough from an inside of the spa shell to an outside of the spa shell. The system may also include a structural support layer on an underside of the shell. The structural support layer may comprise an inner layer of rigidizer that is 0.1 centimeters to 2 centimeters thick, a central foam layer at least 0.5 centimeters thick, and an outer layer of rigidizer that is 0.1 centimeters to 2 centimeters thick. The structural support layer may extend from a bottom side of the underside of the shell, across at least one sidewall of the underside of the shell to a lip of the spa shell, the structural support layer forming at least one rib along the sidewall of the underside of the shell.

In some configurations, the inner layer of rigidizer is formed of at least one selected from the group of polyurethane and polyurea.

According to another aspect, the structural support layer does not cover an area within 5 centimeters of the one or more jets or other component features (such as filtration components, anchors, lights, and audio equipment). For example, the central foam layer of the structural support layer may not cover an area within 5 centimeters of the one or more jets. The structural support layer may not cover at least one jet predetermined location on the sidewall of the underside of the spa shell. The at least one jet predetermined location may include one or more jets and an area of the underside of the spa shell within 5 centimeters of the one or more jets.

According to another aspect, a method for reinforcing a spa shell includes providing a spa shell underside with a bottom side, a lip opposite the bottom side, and a sidewall extending from the bottom side to the lip. The method may also include applying an inner layer of rigidizer to the spa shell underside; placing at least one shield on the spa shell underside at a jet predetermined location; applying a foam support layer on the underside of the spa shell over the inner layer of rigidizer; and applying an outer layer of rigidizer on the spa shell underside over the foam support layer, forming an outer layer of rigidizer that is 0.25 centimeters to 1 centimeters thick.

Forming a spa shell may include co-extruding polymethylmethacrylate with acrylonitrile butadiene styrene to form a layer of co-extruded poly(methyl methacrylate) and acrylonitrile butadiene styrene.

Applying an inner layer of rigidizer onto the spa shell underside may include spraying at least two layers of at least one of polyurethane and polyurea onto the underside of the spa shell, forming an inner layer of rigidizer that is 0.5 centimeters to 1 centimeters thick.

Applying a foam support layer over the inner layer of rigidizer may include spraying at least one of a polyurethane closed-cell foam and a polyurea closed-cell foam onto the underside of the spa shell to form a foam support layer that is at least 0.5 centimeters thick.

Applying an outer layer of rigidizer onto the spa shell underside may include spraying at least two layers of at least one of polyurethane and polyurea onto an underside of the spa shell, forming an outer layer of rigidizer that is 0.25 centimeters to 1 centimeters thick.

Applying a foam support layer may include applying the foam support layer such that it extends from a bottom side of the underside of the spa shell, across at least one sidewall of the underside of the spa shell to a lip of the spa shell to form at least one rib along the sidewall of the underside of the spa shell.

The jet predetermined location may include both a predetermined position of a jet on the spa shell and a circumference around the predetermined position of the jet to allow for installation space.

According to another aspect, none of the inner layer of rigidizer, foam support layer, and outer layer of rigidizer comprise compounds that contain fiberglass.

BRIEF DESCRIPTION OF DRAWINGS

The following drawings illustrate what are currently considered to be specific representative configurations for carrying out the invention and are not limiting as to embodiments which may be made in accordance with the present invention. The components in the drawings are not necessarily to scale relative to each other. Like reference numerals designate corresponding parts throughout the several views.

The drawings are illustrative and not limiting of the scope of the invention which is defined by the appended claims. The various elements of the invention accomplish various aspects and objects of the invention. Not every element of the invention can be clearly displayed in a single drawing, and as such not every drawing shows each element of the invention.

DETAILED DESCRIPTION

The following provides a detailed description of particular embodiments of the present invention. Reference will now be made to the drawings in which the various elements of the illustrated configurations will be given numerical designations and in which the invention will be discussed to enable one skilled in the art to make and use the invention. It is to be understood that the following description is only exemplary of the principles of the present invention, and should not be viewed as narrowing the scope of the claims which follow, which claims define the full scope of the invention.

It will be appreciated that various aspects discussed in one drawing may be present and/or used in conjunction with the embodiment shown in another drawing, and each element shown in multiple drawings may be discussed only once. For example, in some cases, detailed description of well-known items or repeated description of substantially the same configurations may be omitted. This facilitates the understanding of those skilled in the art by avoiding an unnecessarily redundant description. The accompanying drawings and the following description are provided in order for those skilled in the art to fully understand the present disclosure, and these are not intended to limit the scope of claims. All statements herein reciting principles, aspects, and embodiments of the invention, as well as specific examples thereof, are intended to encompass equivalents thereof.

Reference in the specification to "one configuration," "one embodiment," "a configuration," or "an embodiment," means that a particular feature, structure, or characteristic described in connection with the configuration is included in at least one configuration, but is not a requirement that such feature, structure, or characteristic be present in any particular configuration unless expressly set forth in the claims as being present. The appearances of the phrase "in one configuration" in various places may not necessarily limit the inclusion of a particular element of the invention to a single configuration, rather the element may be included in other or all configurations discussed herein.

Furthermore, the described features, structures, or characteristics of configurations of the invention may be combined in any suitable manner in one or more configurations. In the following description, numerous specific details are provided, such as examples of products or manufacturing techniques that may be used, to provide a thorough understanding of configurations of the invention. One skilled in the relevant art will recognize, however, that configurations of the invention may be practiced without one or more of the specific details, or with other methods, components, materials, and so forth. In other instances, well-known structures, materials, or operations are not shown or described in detail to avoid obscuring aspects of the invention.

As used in this specification and the appended claims, singular forms such as "a," "an," and "the" may include the plural unless the context clearly dictates otherwise. Thus, for example, reference to "a jet" may include one or more of such jets, and reference to "the shield" may include reference to one or more of such shields.

As used herein, the term "generally" refers to something that is more of the designated adjective than not, or the converse if used in the negative. As used herein, the term "about" is used to provide flexibility to a numerical range endpoint by providing that a given value may be "a little above" or "a little below" the endpoint while still accomplishing the function associated with the range. For example, "about" may be within 10% of the given number or given range. As used herein, a plurality of items, structural elements, compositional elements, and/or materials may be presented in a common list for convenience. However, these lists should be construed as though each member of the list is individually identified as a separate and unique member.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 5 to about 60" should be interpreted to include not only the explicitly recited values of about 5 to about 60, but also include individual values and sub-ranges within the indicated range. Thus, included in this numerical range are individual values such as 6, 7, 8, 9, etc., through 60, and sub-ranges such as from 10-20, from 30-40, and from 50-60, etc., as well as each number individually. This same principle applies to ranges reciting only one numerical value as a minimum or a maximum. Furthermore, such an interpretation should apply regardless of the breadth of the range or the characteristics being described. Additionally, the word "connected" and "coupled" is used throughout for clarity of the description and can include either a direct connection or an indirect connection.

The present disclosure relates generally to materials and methods for spa shell reinforcement. As used herein, "spa" or "swim spa" refers to a hot tub, swim spa, pool, and/or a jetted tub, whether in ground or aboveground. It will be appreciated that while the rigidifying materials and methods described herein are described in reference to a spa, they may be similarly used in conjunction with a pool or other swimming system, or in other applications. Similarly, "spa shell" refers to the outer shell or structure of the spa, and encompasses the outer structure of a spa or any other swimming vessel, such as the outer structure of a pool, etc. Thus, "spa shell" means both the shell of a spa, the deck of a pool, and other equivalents. Similarly, a "shell" means any vessle capable of holding water. As used herein, the "inside" of the shell or spa shell is the side that faces a user and forms the layer that holds the water within the spa or other vessel. The "underside" of the shell or spa shell is the side that is faced away from a user when the user is within the spa.

Figure 1:
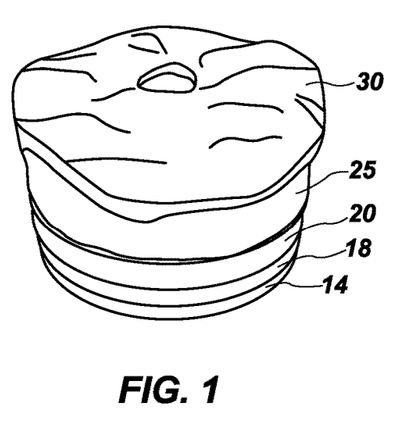
FIG. 1 is a photograph illustrating a perspective, cross-sectional view of a portion of a spa reinforcement system.
Figure 2:
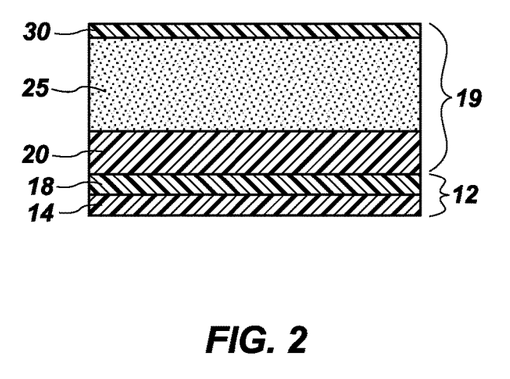
FIG. 2 is a cross sectional representation of the portion of the spa reinforcement system of FIG. 1.
Figure 3:
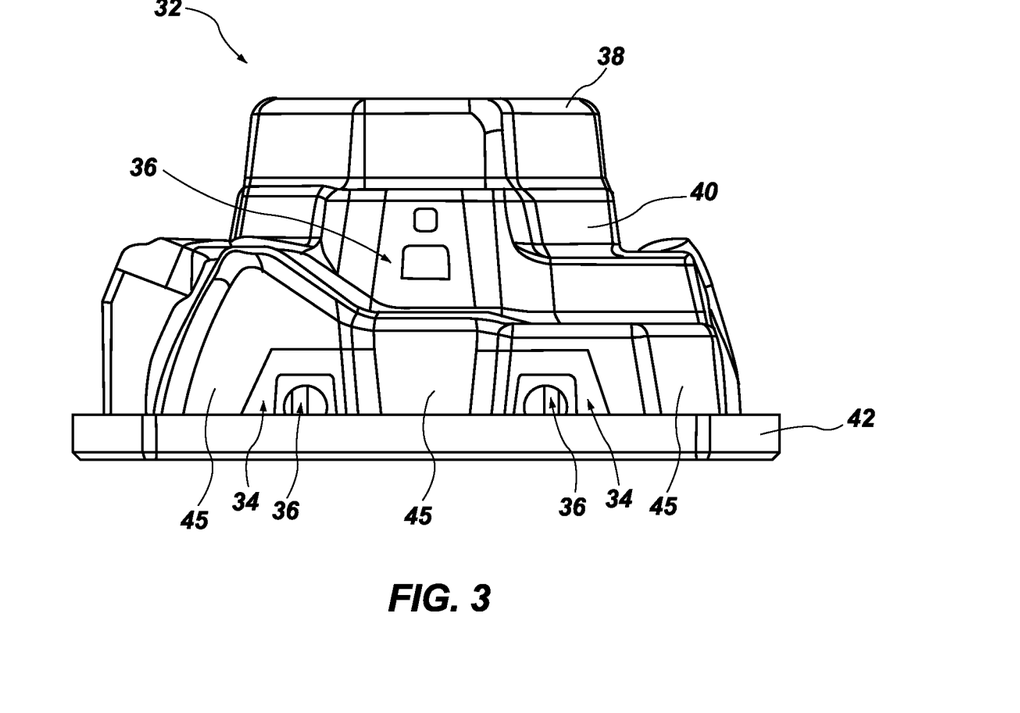
FIG. 3 is front plan view of the underside of a spa shell.
Figure 4:
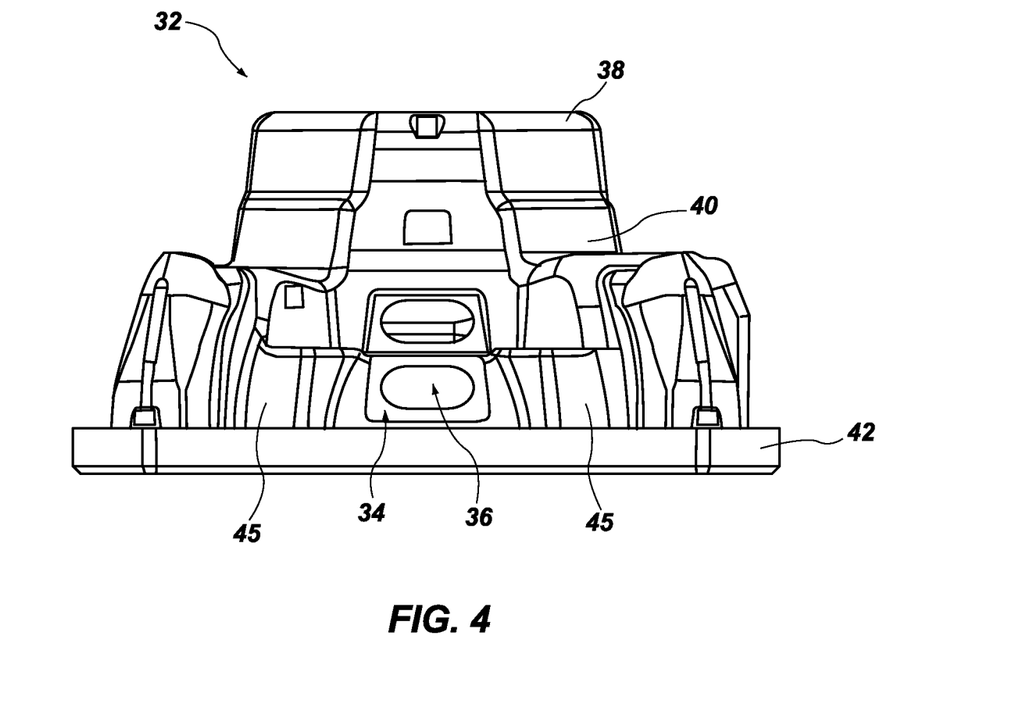
FIG. 4 is a rear plan view of the underside of the spa shell of FIG. 3.

Referring to FIGS. 1-2, an exemplary configuration of an embodiment of a layered swim spa shell 10 may include one or more of the following layers: a spa shell layer 12, which may include an acrylic layer 14, and an optional acrylonitrile butadiene styrene (ABS) layer 18; and a layer of structural support material 19, which may include an inner layer of rigidizer 20, a layer of foam 25 (or strategically placing EPS (expanded polystyrene) blocks or other suitable cushioning material), and an outer layer of rigidizer 30.

The acrylic layer 14 is the layer on the inside of the spa seen by users so it may be desirable to use an aesthetic acrylic for this layer 14 of the spa shell 12. Other materials for the first layer, or inside of the spa shell 12 may also be used, such as a thermosetting gel coat, an acrylate polymer, a polystyrene polymer, polyvinyl chloride, polycarbonate, acrylonitrile-butadiene-styrene, or any rigid single or multilayer thermoplastic or thermosetting material adaptable for providing a smooth, durable vessel for the inside of the spa shell 12. Any thermoplastic such as acrylic, ABS, polyproylene, polyethylene, centrex, etc., either as a coextruded sheet or singular in composition may be used to form the spa shell layer 12. The acrylic or other composition of the shell 12 may further comprise one or more additives such as colorants, color stabilizers, ultraviolet radiation stabilizers, antioxidants, antistatic agents, texturizers, fillers, and other materials to modify properties of the shell or enhance its longevity, as known in the art. A variety of polyacrylates, polycarbonates, and various optional additives are also known in the art.

The acrylic layer 14 and the ABS laminate layer 18 may be co-extruded and then molded to form the spa shell v12. For example, an aesthetic acrylic may be co-extruded with a more robust material, such as ABS. In other embodiments, a layer of ABS 18 or other thermoplastic may not be provided. In yet other embodiments, other materials may be used for the spa shell layer 12, such as other thermoplastics, as well as ABS blended with other polymers such as PA, PBT, PC, etc. It may be desired to co-extrude the acrylic with a thermoplastic layer, so in some configurations, the thermoplasic layer may be formed of a thermoplastic that is capable of being co-extruded.

Shells 10 may also be manufactured from formable sheets which are heated and applied over a mold having vacuum capacity to draw the sheet into contact with the mold. The spa shell layer 12 may be molded of the co-extruded acrylic layer 14 and ABS layer 18. Where an ABS layer 18 is not used, the spa shell may be molded from the acrylic layer 14 only. After the spa shell is formed, it may then be prepared for application of one or more layers of material for structural reinforcement on an underside 32 of the spa.

After formation, the underside 32 of the spa shell layer 12 is typically surrounded by a rigid layer or layers designed to provide increased structural integrity. For example, it is known in the art to coat the underside 32 of the shell with one or more layers of fiberglass applied with an epoxy, vinyl ester, or polyester resin. This is a relatively time consuming process, which typically requires rolling and other processes to obtain an evenly adhered rigid layer. Perhaps even more problematic is that the application of vinyl ester, polyester resin and fiberglass layers results in the emission of volatile organic compounds which can pose health hazards to exposed workers and create an environmental risk.

Another type of structural support layer 19 to provide increased structural integrity to the spa shell layer 12 may be comprised of a foam or other open-celled material. Foam alone, though, may not be rigid or strong enough to support the spa. In order to strengthen the foam, an inner layer 20 of rigidizer and/or an outer layer 30 of rigidizer may be used to sandwich the foam 25 between one or more layers of rigidizer. This thick layer of open-cell foam 25 or other suitable soft structural material, sandwiched between rigid layers 20, 30, may provide the desired increased structural integrity to the spa shell while also providing improved ease in manufacturing and no volatile chemical emissions.

Additionally, because the structural support layers 19 as described herein may form a thickness that makes it difficult to drill through to install jets, etc., onto the spa shell layer 12, a method may be provided to prevent placement of the structural support layers 19 on predetermined portions of the spa shell 12 that will have jets and other critical structures placed.

In some configurations, after the spa shell 10 is molded of a co-extruded material, the structural support layer may be applied to the underside 32 of the spa shell 12. First, one or more layers of a rigidizer may be sprayed or otherwise applied to the underside 32 of the spa shell. Any suitable rigidizer may be used; reference to "rigidizer" or "a rigidizer" comprises any suitable reinforcing material, and may include one or more layers of polyurethane, polyurea, epoxy, polyaspartic, 2-part polyurethane, acrylic, etc. The first of rigidizer applied to the underside of the spa shell forms an inner layer 20 of rigidizer. Typically, this inner layer 20 may be between about 0.3 centimeters to about 1.5 centimeters thick. Thinner or thicker applications may be used in other configurations.

Either before application of the inner layer of rigidizer 20, or after the application of the inner layer of rigidizer 20 and before the application of the foam layer 25, one or more shields 34 may be placed on the underside of the spa shell (see FIGS. 3-6). As mentioned above, the structural support layer 19 (and particularly the layer of foam 25 in the structural support layer 19), may be fairly thick and difficult to drill through or otherwise remove in order to place elements such as jets, etc., onto the shell of the spa. Rather than apply the structural support layer 19 to the entire underside 32 of the spa shell, one or more shields 34 may be placed on the underside of the spa shell to limit application of the structural support layer 19 to portions that will not have a jet or other element placed directly on the spa shell.

Figure 5:
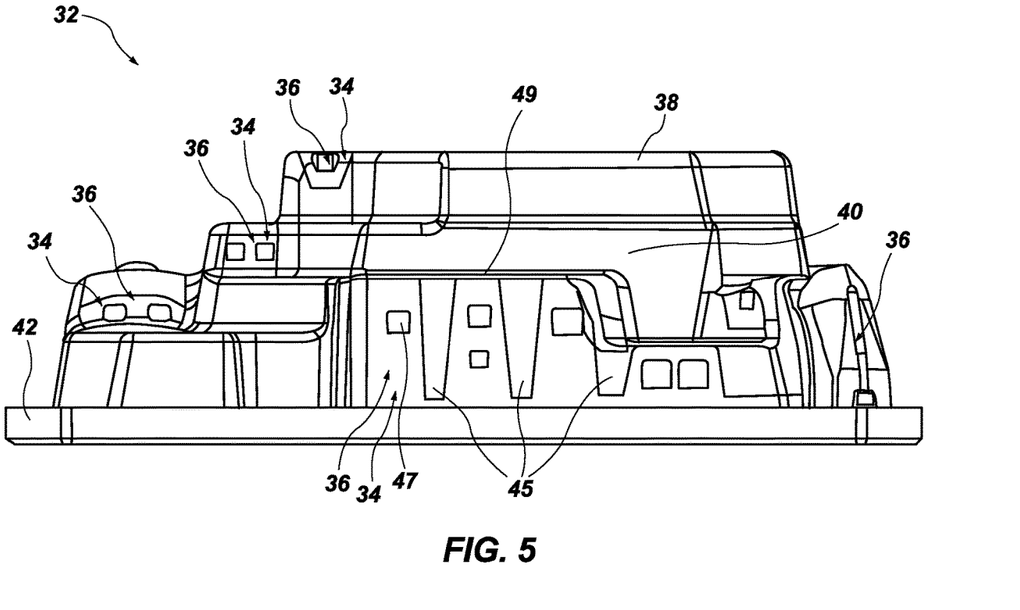
FIG. 5 is a left side plan view of the underside of the spa shell of FIG. 3.
Figure 6:
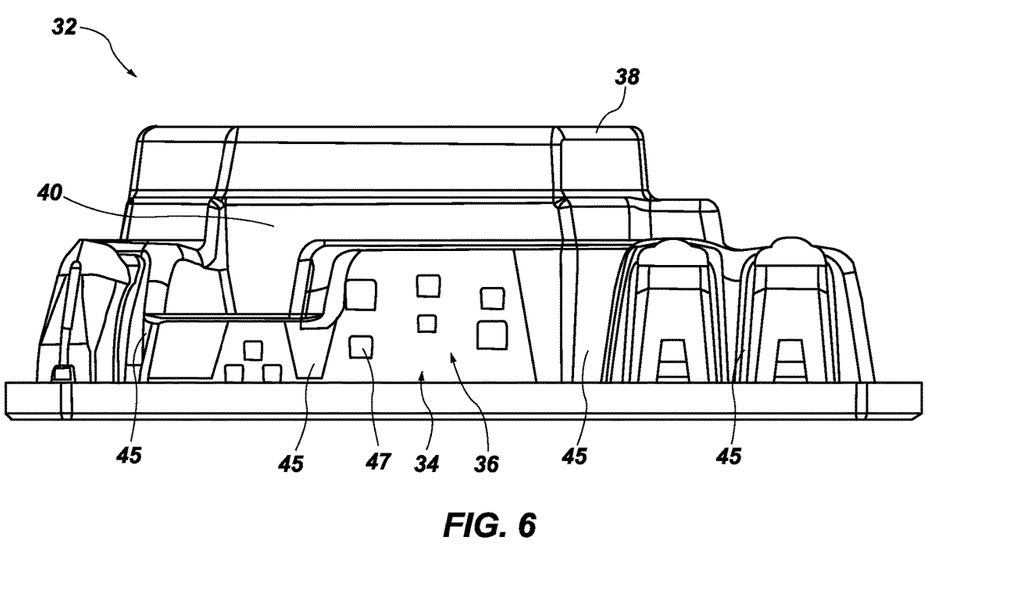
FIG. 6 is a right side plan view of the underside of the spa shell of FIG. 3.

For example, referring briefly to FIGS. 5-6, jet predetermined locations 36 may be specified, and shields 34 may be placed over these predetermined locations 36. Other perforations may also be needed in the spa shell for filters and other critical structures, and "jet predetermined locations" encompasses all such areas of the spa that may need such perforations. Additionally, jet predetermined locations 36 may include not just the exact surface of the underside of the spa shell of the spa where the jets, etc., may be placed, but also a circumference around the structures to allow space for installation of jets, etc. As discussed in more detail below, the placement of the shield(s) 34 and/or structural support layer 19 may be configured such that the structural support layer 19 forms one or more ribs to provide additional structural support to the spa shell. In other configurations, shields 34 may not be used and the structural support layers 19 may be applied to the underside 32 of the spa shell without the need for shields 34.

Shield(s) 34 may be, for example, any suitable material that can be used to block the application of the foam layer 25. Simple shield(s) 34 may be formed of pieces of cardboard taped into position over the jet predetermined locations 36 or locations for other structures that pass through the spa shell. After the application of the foam layer 25, the cardboard shields 34 can be removed (for example, by cutting out the cardboard). Another option for shields 34 includes using a complementary shell mold. This shield 34 would be comprised of a complementary spa shell, having the portions where foam application is desired removed from the complementary shell (in other words, portions where protection or shielding are needed are left remaining on the complementary shell). The complementary spa shell may then be placed over the spa shell and the foam layer 25 applied. Other methods of shielding may include using stretch tape to cover the jet predetermined locations 36, forming shields 34 of non-stick material to cover the jet predetermined locations 36, etc.

After the optional placement of shield(s) 34, the foam layer 25 may be applied. The foam layer 25 may be comprised of any suitable open-cell or closed-cell foam material. Closed-cell foams are generally more rigid, while open-cell foams are usually more flexible. For example, any polymer foam (thermoplastic or thermoset, rigid or flexible), polyurethane foams, polyethylene foam, ethylene vinyl acetate foam, chloroprene elastomeric (FloTex) foam, polyethylene (cross-poly) foam, latex foam, low-resilience polyurethane foam, etc., may be used. The foam material for the foam layer 25 may be selected, for example, based on its density, and/or its coefficient of expansion. The foam layer 25 may comprise other types of material that are not foam, such as any suitable type of low density material to form a low-density core. In one configuration, the foam layer 25 is formed of a sprayable material. In other configurations, one or more blocks of foam material 25 may be used. The foam layer 25 may also be comprised of foam alternatives such as corrugated materials, etc.

One desired arrangement may be an inner layer 20 and an outer layer 30 of rigidizer made of a reinforcing material with a coefficient of expansion, and a central foam layer 25 made of a foam material that has a similar coefficient of expansion as the rigidizing material. The coefficient of expansion is the ratio of the increase of length, area, or volume of a body per degree rise in temperature to its length, area, or volume, respectively, at a specified temperature, commonly 0° C., the pressure being kept constant. When the coefficient of expansion of the rigidizing material is similar or the same as the coefficient of expansion of the foam material, both the inner layer 20 and outer layer 30 of rigidizer may move similarly to the foam layer 25 when the materials are subject to different temperature conditions. This may reduce cracking of the structural support layer 19. In one configuration, 2-pound medium density closed-cell spray polyurethane foam is used. This foam typically weighs between 1.5 pounds and 2 pounds per square foot when fully cured. Closed-cell foam may also have a higher R-value compared to open cell foam, indicating greater insulating properties which may be desirable when heating water within spas.

With reference to FIGS. 3-6, in configurations where shield(s) 34 are used to discretely apply one or more layers of structural support 19 to the underside of the spa shell, the shield(s) 34 may be placed to ensure that the one or more layers of structural support 19 have contiguous portion(s) from a bottom 38 of the underside of the spa shell 12, up one or more sidewalls 40 of the underside 32 of the spa shell layer 12, to a lip 42 of the spa shell 12. The structural support layer 19 may thus form one or more ribs 45 on a sidewall 40. The shaded portions of FIGS. 3-6 illustrate where the inner foam layer 25 may be applied. These ribs 45 of structural support layers 19 may create an I-beam type structure to reinforce the spa shell and provide strength to handle the load associated with water in the shell. This may be particularly helpful in large spas, such as swim spas, and also in other smaller spas.

The shield(s) 34 may cover not just the exact location of a jet 47, but also the area surrounding the jet 47 to allow for space for installation. "Jet predetermined location" may encompass both the exact location of the jet 47 as well as a circumference or buffer zone around the exact location for ease of installation. "Jet predetermined location" also includes other component features such as filtration components, anchors, lights, audio equipment, etc. Where multiple jets 47 are installed adjacent each other, a single shield 34 may be used to cover the entire area as a jet predetermined location 36. After the shield(s) 34 have been placed over the jet predetermined locations 36, the foam layer 25 may be applied. The shields 34 may act both to protect the jet predetermined locations 36 and to strategically create ribs 45 of structural support layer 19.

Application of the foam layer 25 may be further targeted to specific areas of the spa that need additional support. For example, the bottom 38 of the spa shell may be able to transfer weight directly into the ground. However, a bench 49 (FIG. 5) may be under substantial pressure from the weight of water above it, but may not be able to transfer this weight directly to the ground. A bench 49 that is longer in length, such as those which may be in a large spa like a swim spa, may be particularly susceptible to flexing and may benefit from additional structural support. Benches and other structures in need of additional support may be provided with thicker layers of rigidizer and/or foam.

In configurations where shield(s) 34 are not used, the layer of foam 25 may be placed manually to form one or more ribs 45. For example, pre-cut blocks of foam material may be used for the layer of foam 25. After the inner layer 20 of rigidizer is applied, pre-cut foam blocks may be manually applied to the inner layer 20 of rigidizer, forming a structural support layer 19 having contiguous portion(s) from a bottom 38 of the underside of the spa shell 12, up one or more sidewalls 40 of the underside 32 of the spa shell 12, to a lip 42 of the spa shell 12. After the foam layer 25 is applied creating one or more ribs 45, the outer layer 30 of rigidizer may be applied.

The outer layer 30 of rigidizer may interface either directly with the layer of foam 25, or in portions which were shielded from the foam layer 25 by one or more shields 34, the outer layer 30 of rigidizer may interface directly with the first layer 20 of rigidizer. Two layers 20, 30 of rigidizer at select portions of the shell may lend additional strength to the shell structure.

The outer layer 30 of rigidizer may comprise any suitable material, and in some configurations, may be the same type of material as the material used for the inner layer 20 of rigidizer. The outer layer 30 of rigidizer may be, for example, polyurethane. The outer layer 30 of rigidizer may be applied by spraying at least two layers of polyurethane onto an underside of the spa shell, over the layer of foam 25, forming an outer layer 30 of rigidizer that is 0.25 centimeters to 1 centimeters thick. In some configurations, the outer layer of rigidizer may be thicker or thinner, depending on desired results and stability needed. In some configurations, the inner layer 20 of rigidizer may be thicker than the outer layer 30 of rigidizer.

The structural support layer 19 may additionally act as an insulator that protects the outside rigidizing layer 30 from temperatures inside the spa (which can often be high), preserving the strength of the outer rigidizing layer 30. The structural support layer 19 may also improve efficiencies for thermal control and energy use.

Figure 7:
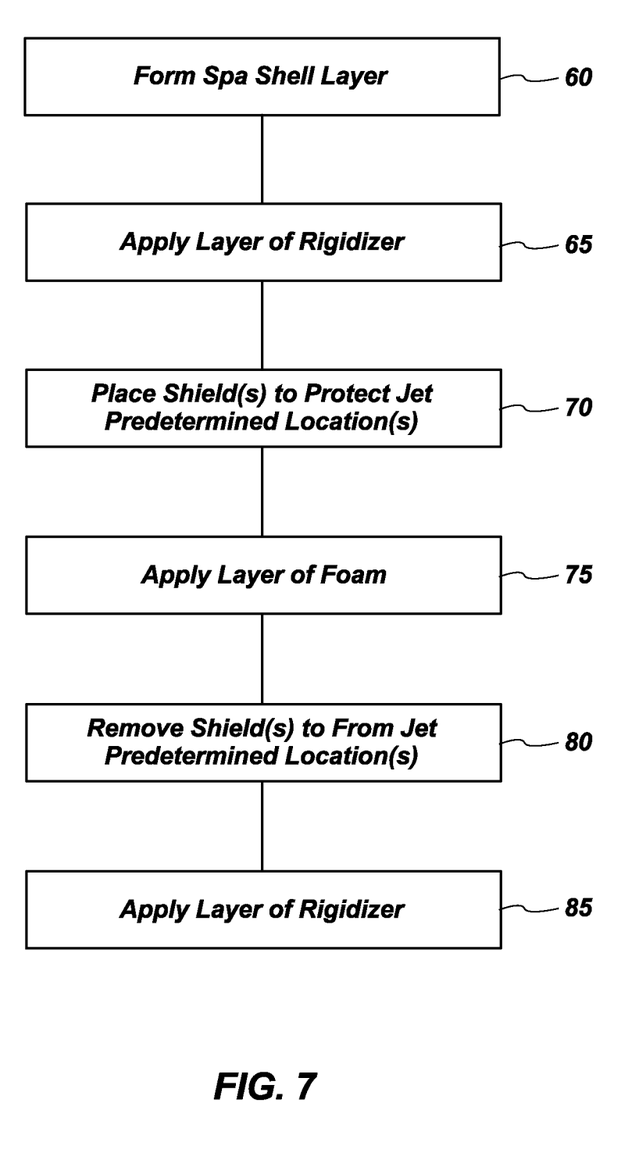
FIG. 7 is a flow chart of steps that may be taken in an exemplary method.

With reference to FIG. 7, an exemplary method may first comprise forming a spa shell (60). The spa shell may be formed in any suitable manner known in the art. For example, the spa shell may be formed by co-extruding polymethylmethacrylate with acrylonitrile butadiene styrene to form a layer of co-extruded poly(methyl methacrylate) and acrylonitrile butadiene styrene. The co-extruded layer may then be placed over a mold to form the spa shell. After the spa shell is formed, an inner layer of rigidizer may be applied to the underside of the spa shell (65). For example, a polyurethane or polyurea coating may be sprayed to the underside of the spa shell.

Next, one or more shields may be applied to the underside of the spa shell to protect one or more jet predetermined locations (70). Jet predetermined locations may include both the exact location for the one or more jets, as well as a buffer zone around the exact location for the one or more jets. For example, a buffer zone of 5 centimeters to 40 centimeters around the exact location for the jet may be provided. This may give space and room for installation of the jet(s) and/or other critical features. Additionally, shields may be placed such that one or more ribs or fingers of the foam layer may still extend from the bottom side of the spa shell, up the sidewall of the spa, to a lip of the spa shell. In this manner, the structural integrity of the support layer can be strengthened without having entire sections of the support layer terminate before the lip of the spa shell.

After the one or more shields are in place, the layer of foam may be applied (75). Any suitable thickness and type of foam may be used as described herein. The foam may form one or more ribs extending from the bottom side of the spa shell, up the sidewall of the spa to a lip of the spa shell. After the foam layer is applied, the shield(s) may be removed (80). The outer layer of rigidizer may then be applied (85). In other configurations, the shield may be removed and applied sooner in the process or later. For example, the shield may be applied before the inner layer of rigidizer is applied, and/or the shield may be removed after the outer layer of rigidizer is applied.

Aspect 1: A method for reinforcing a spa shell, the method comprising the following steps taken in the following order: co-extruding polymethylmethacrylate with acrylonitrile butadiene styrene to form a layer of co-extruded poly (methyl methacrylate) and acrylonitrile butadiene styrene; molding the layer of co-extruded poly(methyl methacrylate) and acrylonitrile butadiene styrene into a predetermined spa shell shape to form a spa shell; spraying at least two layers of polyurethane onto an underside of the spa shell, forming an inner layer of rigidizer that is 0.5 centimeters to 1 centimeters thick; placing at least one shield on the underside of the spa shell at a jet predetermined location to prevent a foam support layer from forming over the jet predetermined location; applying a foam support layer that is 0.5 centimeters to 3 centimeters thick on the underside of the spa shell over the inner layer of rigidizer, the foam support layer extending from a bottom side of the underside of the spa shell, across at least one sidewall of the underside of the spa shell to a lip of the spa shell, the foam support layer forming at least one rib along the sidewall of the underside of the spa shell; and spraying at least two layers of polyurethane onto the underside of the spa shell, forming an outer layer of rigidizer that is 0.25 centimeters to 1 centimeters thick.

Aspect 2: The method of Aspect 1, wherein the method further comprises removing the at least one shield on the underside of the spa shell after placing the foam support layer and prior to spraying the at least two layers of polyurethane forming the outer layer of rigidizer.

Aspect 3: The method of Aspect 1 or Aspect 2, further comprising the step of drilling at least one hole through the spa shell, the inner layer of rigidizer, and the outer layer of rigidizer, and placing a jet therethrough.

Aspect 4: The method of any of Aspects 1-3, wherein placing the foam support layer comprises spraying at least one of a polyurethane closed-cell foam and a polyurea closed-cell foam onto the underside of the spa shell.

Aspect 5: A shell reinforcing system comprising: a shell for containing water having one or more jets extending therethrough from an inside of the shell to an outside of the shell; a structural support layer on an underside of the shell, the structural support layer comprising an inner layer of rigidizer that is 0.1 centimeters to 2 centimeters thick, a central foam layer at least 0.5 centimeters thick, and an outer layer of rigidizer that is 0.1 centimeters to 2 centimeters thick; and wherein the structural support layer extends from a bottom side of the underside of the shell, across at least one sidewall of the underside of the spa shell to a lip of the shell, the structural support layer forming at least one rib along the sidewall of the underside of the shell.

Aspect 6: The spa shell reinforcing system of Aspect 5, wherein the inner layer of rigidizer comprises at least one of polyurethane and polyurea.

Aspect 7: The spa shell reinforcing system of Aspect 5 or Aspect 6, wherein the structural support layer does not cover an area within 5 centimeters of the one or more jets.

Aspect 8: The spa shell reinforcing system any of Aspects 5-7, wherein the central foam layer of the structural support layer does not cover an area within 5 centimeters of the one or more jets.

Aspect 9: The spa shell reinforcing system of any of Aspects 5-8, wherein the structural support layer does not cover at least one jet predetermined location on the sidewall of the underside of the spa shell.

Aspect 10: The spa shell reinforcing system of any of Aspects 5-9, wherein the at least one jet predetermined location comprises the one or more jets and an area of the underside of the spa shell within 5 centimeters of the one or more jets.

Aspect 11: The spa shell reinforcing system of any of Aspects 5-10, wherein the spa shell is comprised of a layer of co-extruded poly(methyl methacrylate) and acrylonitrile butadiene styrene.

Aspect 12: A method for reinforcing a spa shell, the method comprising forming a spa shell having a spa shell underside with a bottom side, a lip opposite the bottom side, and a sidewall extending from the bottom side to the lip; applying an inner layer of rigidizer to the spa shell underside; placing at least one shield on the spa shell underside at a jet predetermined location; applying a foam support layer on the underside of the spa shell over the inner layer of rigidizer; and applying an outer layer of rigidizer on the spa shell underside over the foam support layer, forming an outer layer of rigidizer that is 0.25 centimeters to 1 centimeters thick.

Aspect 13: The method of Aspect 12, wherein forming a spa shell comprises co-extruding polymethylmethacrylate with acrylonitrile butadiene styrene to form a layer of co-extruded poly(methyl methacrylate) and acrylonitrile butadiene styrene.

Aspect 14: The method of Aspect 12 or 13, wherein applying an inner layer of rigidizer onto the spa shell underside comprises spraying at least two layers of at least one of polyurethane and polyurea onto an underside of the spa shell, forming an inner layer of rigidizer that is 0.5 centimeters to 1 centimeters thick.

Aspect 15: The method of any of Aspects 12-14, wherein applying a foam support layer over the inner layer of rigidizer comprises spraying at least one of a polyurethane closed-cell foam and a polyurea closed-cell foam onto the underside of the spa shell to form a foam support layer that is at least 0.5 centimeters thick.

Aspect 16: The method of any of Aspects 12-15, wherein the step of applying an outer layer of rigidizer onto the spa shell underside comprises spraying at least two layers of at least one of polyurethane and polyurea onto an underside of the spa shell, forming an outer layer of rigidizer that is 0.25 centimeters to 1 centimeters thick.

Aspect 17: The method of any of Aspects 12-16, wherein the step of applying a foam support layer comprises applying the foam support layer such that it extends from a bottom side of the underside of the spa shell, across at least one sidewall of the underside of the spa shell to a lip of the spa shell to form at least one rib along the sidewall of the underside of the spa shell.

Aspect 18: The method of any of Aspects 12-17, wherein the jet predetermined location comprises a predetermined position of a jet on the spa shell and a circumference around the predetermined position of the jet to allow for installation space.

Aspect 19: The method of any of Aspects 12-18, wherein none of the inner layer of rigidizer, foam support layer, and outer layer of rigidizer comprise compounds that contain fiberglass.

Although the foregoing disclosure provides many specifics, such as use of the system in spas, it will be appreciated that pools, and other water holding devices are contemplated and these should not be construed as limiting the scope of any of the ensuing claims. Other embodiments and configurations may be devised which do not depart from the scopes of the claims. Features from different embodiments and configurations may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

The invention claimed is:

1. A method for reinforcing a spa shell, the method comprising:
   molding a thermoplastic sheet into a predetermined spa shell shape to form a shell for containing water;
   spraying at least two layers of polyurethane onto an underside of the spa shell, forming an inner layer of rigidizer that is 0.2 centimeters to 1 centimeter thick;
   placing at least one shield on the underside of the spa shell at a jet predetermined location to prevent a foam support layer from forming over the jet predetermined location;
   applying a foam support layer that is 0.5 centimeters to 3 centimeters thick on the underside of the spa shell over the inner layer of rigidizer, the foam support layer extending from a bottom side of the underside of the spa shell, across at least one sidewall of the underside of the spa shell to a lip of the spa shell, the foam support layer forming at least one rib along the sidewall of the underside of the spa shell; and
   spraying at least two layers of polyurethane onto the underside of the spa shell, forming an outer layer of rigidizer that is 0.25 centimeters to 1 centimeter thick.

2. The method of claim 1, wherein the method further comprises removing the at least one shield on the underside of the spa shell after placing the foam support layer and prior to spraying the at least two layers of polyurethane forming the outer layer of rigidizer.

3. The method of claim 1, further comprising drilling at least one hole through the spa shell, the inner layer of rigidizer, and the outer layer of rigidizer, and placing a jet therethrough.

4. The method of claim 1, wherein placing the foam support layer comprises spraying at least one of a polyurethane closed-cell foam and a polyurea closed-cell foam onto the underside of the spa shell.

5. A method for reinforcing a spa shell, the method comprising:
   forming a spa shell having a spa shell underside with a bottom side, a lip opposite the bottom side, and a sidewall extending from the bottom side to the lip;
   applying an inner layer of rigidizer to the spa shell underside;
   placing at least one shield on the spa shell underside at a jet predetermined location;
   applying a foam support layer on the underside of the spa shell over the inner layer of rigidizer; and
   applying an outer layer of rigidizer on the spa shell underside over the foam support layer, forming an outer layer of rigidizer that is 0.25 centimeters to 1 centimeter thick.

6. The method of claim 5, wherein forming a spa shell comprises co-extruding polymethylmethacrylate with acrylonitrile butadiene styrene to form a layer of co-extruded poly(methyl methacrylate) and acrylonitrile butadiene styrene.

7. The method of claim 5, wherein applying an inner layer of rigidizer onto the spa shell underside comprises spraying at least two layers of at least one of polyurethane and polyurea onto an underside of the spa shell, forming an inner layer of rigidizer that is 0.5 centimeters to 1 centimeter thick.

8. The method of claim 5, wherein applying a foam support layer over the inner layer of rigidizer comprises spraying at least one of a polyurethane closed-cell foam and a polyurea closed-cell foam onto the underside of the spa shell to form a foam support layer that is at least 0.5 centimeters thick.

9. The method of claim 5, wherein applying an outer layer of rigidizer onto the spa shell underside comprises spraying at least two layers of at least one of polyurethane and polyurea onto an underside of the spa shell, forming an outer layer of rigidizer that is 0.25 centimeters to 1 centimeter thick.

10. The method of claim 5, wherein applying a foam support layer comprises applying the foam support layer such that it extends from a bottom side of the underside of the spa shell, across at least one sidewall of the underside of the spa shell to a lip of the spa shell to form at least one rib along the sidewall of the underside of the spa shell.

11. The method of claim 5, wherein the jet predetermined location comprises a predetermined position of a jet on the spa shell and a circumference around the predetermined position of the jet to allow for installation space.

12. The method of claim 5, wherein none of the inner layer of rigidizer, foam support layer, and outer layer of rigidizer comprise compounds that contain fiberglass.

13. The method of claim 5, wherein the method further comprises removing the at least one shield on the underside of the spa shell after applying the foam support layer and prior to applying the outer layer of rigidizer.

14. A method for reinforcing a spa shell, the method comprising:
   selecting a spa shell having a spa shell underside with a bottom side, a lip opposite the bottom side, and a sidewall extending from the bottom side to the lip;
   applying an inner layer of rigidizer to the spa shell underside;
   applying a foam support layer on the underside of the spa shell over the inner layer of rigidizer; and
   applying an outer layer of rigidizer on the spa shell underside over the foam support layer, forming an outer layer of rigidizer that is 0.25 centimeters to 1 centimeter thick.

* * * * *